Patented Aug. 25, 1953

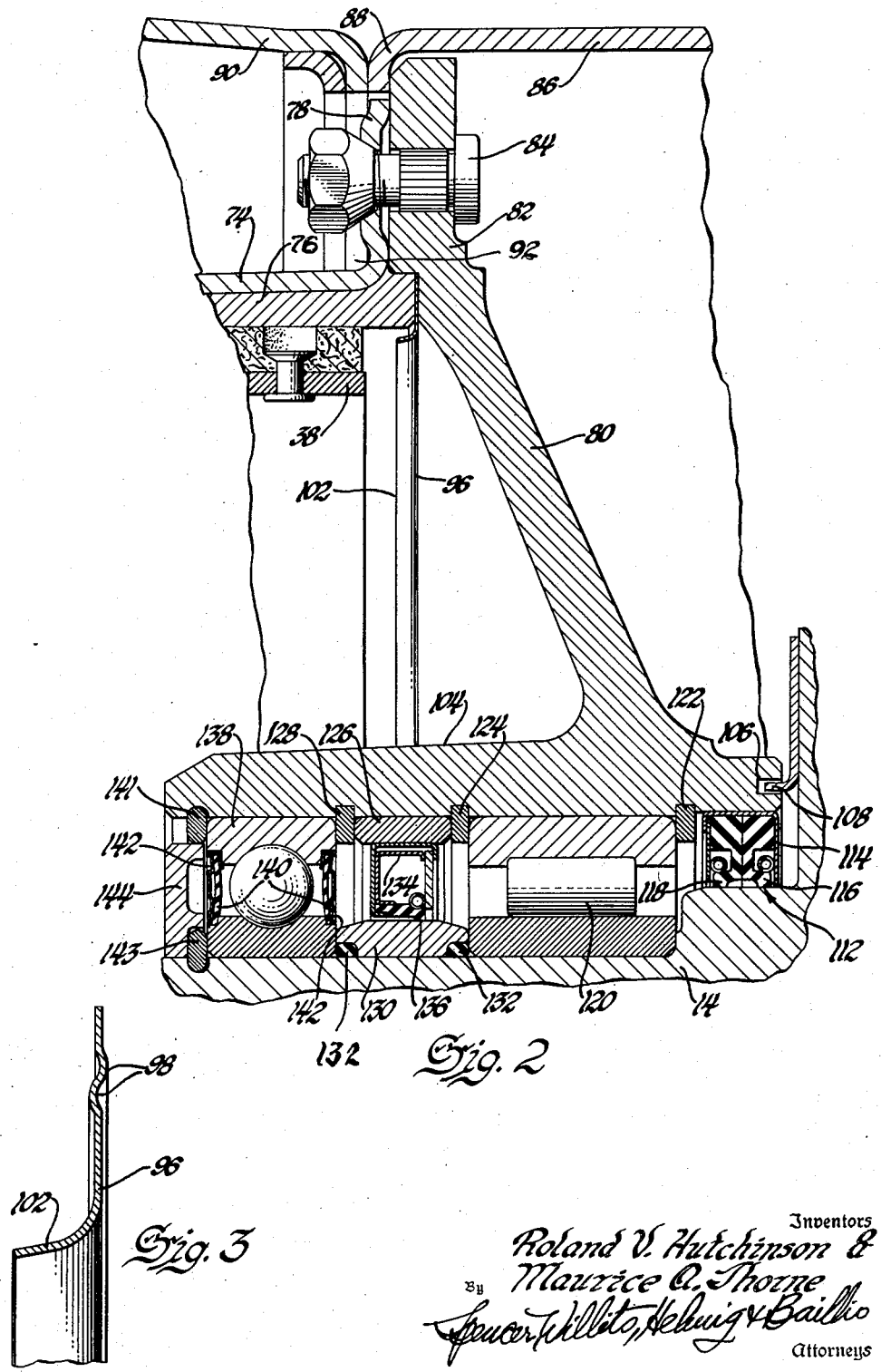

2,649,922

UNITED STATES PATENT OFFICE 2,649,922

DRIVEN STEERING WHEEL

Roland V. Hutchinson, Birmingham, and Maurice A. Thorne, Detroit, Mich., assignors to General Motors Corporation, Detroit, Mich., a corporation of Delaware Application April 6, 1949, Serial No. 85,870

3 Claims. (Cl. 180—43)

This invention relates to a waterproof brake for a driving wheel.

The object of this invention is to provide an improved sealed brake for use on a steering and driving wheel wherein the drum is sealed to a solid hub and the hub is sealed to a supporting shaft by ring seals to prevent the entrance of foreign matter and the egress of lubricant from the bearings.

Another object of the invention is to provide an improved sealed brake structure with a double lip seal preventing the ingress of foreign matter to the bearings and brake, and the egress or less of lubricant from the bearings.

Another object of the invention is to provide an improved sealed brake in which the drum is sealed to a hub by an undulated resilient metal seal, and the hub is sealed to the supporting shaft by a double lip seal and a single lip seal with a bearing therebetween and a second thrust bearing secured in place by a pair of snap rings and a locking device.

This invention provides, in a wheel structure having a hollow supporting axle with a drive shaft extending therethrough, a waterproof housing for the brake mechanism formed by the brake drum and wheel hub. The drive shaft is connected and sealed to the outer flange of the brake drum, the inner flange of the brake drum is sealed to the hub by a resilient metal seal, and the hub is rotatably supported and sealed to the supporting axle to prevent loss of grease and contamination of the brake mechanism.

Other features and objects of the invention will be apparent from the following description and drawings of the invention.

Figure 2 is an enlarged section of the wheel hub and seals.

Figure 3 is a detail of an annular undulated seal.

Figure 1:
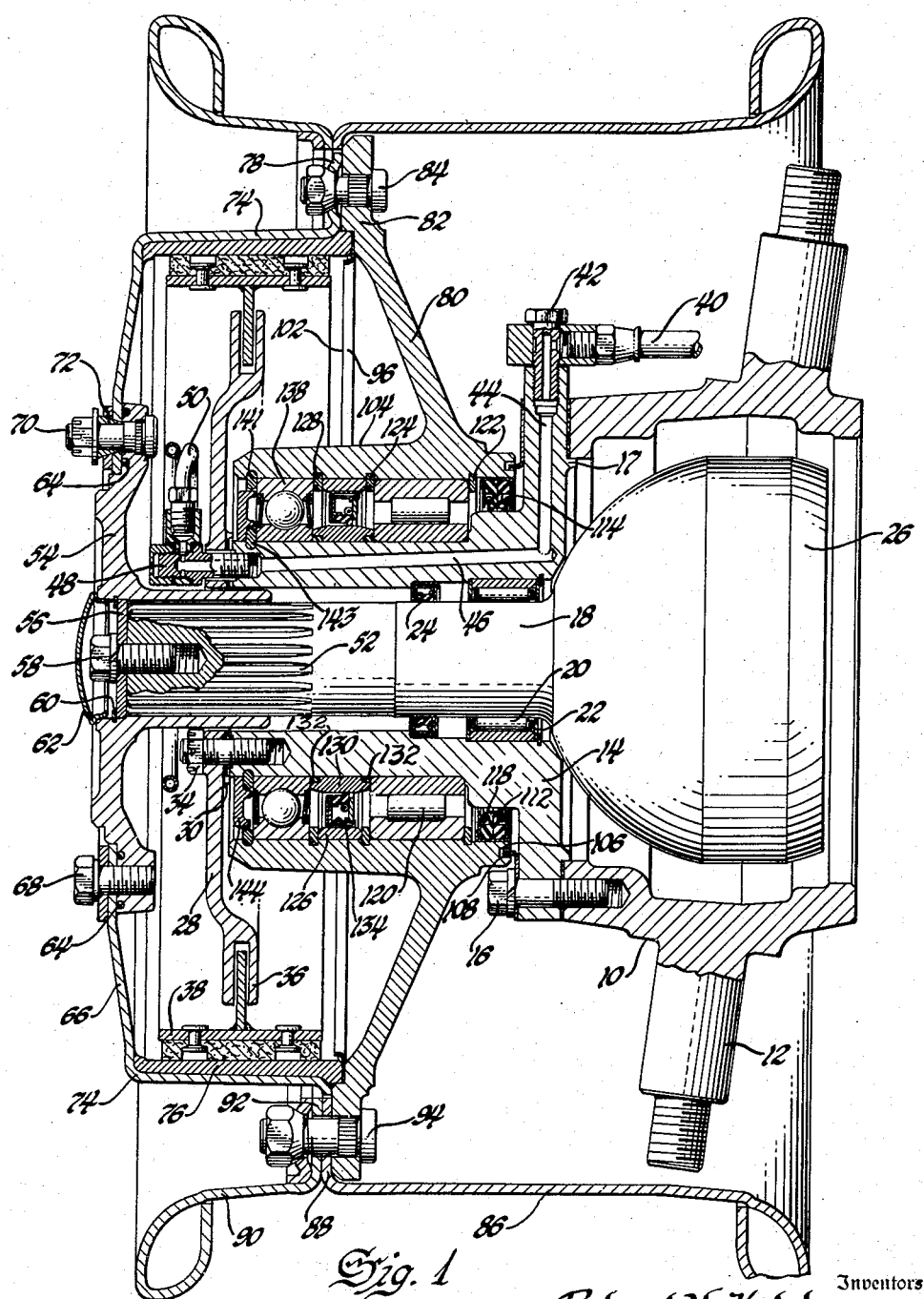
Figure 1 is a transverse section through a front wheel and steering knuckle.

Referring to the drawing, the invention is illustrated as employed on a driving and steering wheel of a vehicle. The wheel is supported for pivotal movement by the steering knuckle 10, which is mounted for pivotal movement by the king pins 12. A non-rotatable or hollow supporting axle 14 is secured to the steering knuckle 10 by bolts 16 and centered thereon by the annular ridge 17 on the axle. The joint between the steering knuckle and supporting axle may be sealed by a suitable gasket. Within the supporting axle 14 a driving shaft 18 is coaxially mounted in the roller bearing 20 which is suitably seated on a shoulder and retained within the supporting axle 14 by a retainer snap ring 22. On the outer side of the bearing 20 a grease retainer 24 seated on a shoulder prevents grease from flowing out between the supporting axle and the driving shaft and contaminating the brake. The driving shaft 18 has at the inner end an enlargement or universal joint 26 for universally connecting the driving shaft to the swinging driving shaft (not shown).

A generally annular brake support or spider 28 is attached to the outer end of the supporting axle 14 by interengaging splines 30 on the end face of the axle 14 and on the side of the support 28, and bolts or studs 34. The outer end of the support 28 has bifurcated portions 36 to guide the web of brake shoes 38. The wheel cylinders and brake shoe anchors, though not shown, are also supported on support member 28. The hydraulic fluid for the brakes is supplied through the flexible conduit 40 to the rotatably adjustable fitting 42 which provides a connection to the bore 44 in the supporting axle 14. The bore 44 connects with the axial bore 46 which conducts the fluid to adjustable fitting 48 which extends through the support 28 and is secured in the end of bore 46 in the supporting axle 14. Suitable conduits 50 connect this fitting to the wheel cylinders.

The outer end of the driving shaft 18 has splines 52 which interengage with splines in the bore in the coupling disc 54. The coupling disc is drawn and held on the shaft 18 by a washer 56 seated on a shoulder in the bore of the coupling disc and secured to the end of the shaft by a bolt 58. A retainer snap ring 60 prevents washer 56 from falling out. The bore in coupling disc 54 is sealed by cap 62. The outer periphery of the disc 54 has a pair of annular grooves for gaskets 64 to seal the joint between the disc and the brake drum flange 66. Suitable bolts and studs 68 and 70, a portion of which may have split conical bushings 72 to properly locate the drum, may be employed to secure the coupling disc to the drum flange. The drum 74 has a centrifugally cast braking surface 76. At the inboard side of the brake drum 74 spaced extensions or lugs 78 extend outwardly and in effect form an interrupted flange.

The rotatable hub 80 has a radially extending flange 82 or peripheral portion with suitable apertures to receive studs or bolts 84 holding the drum to the hub. The wheel rim is formed of an inner bead section 86 having spaced inwardly projecting ears or lugs 88 and the outer bead section 90 with spaced inwardly projecting ears 92. The ears 88 and 92 match and are suitably apertured to be bolted by bolts 94 to the hub 80 between the lugs 78 on the drum.

The bolts 84 which hold the drum 74 to the hub 80 compress a metal gasket 96 between the edge of the cast portion 76 of the drum and the hub. The gasket 96 has a pair of annular undulations 98 formed in the resilient metal gasket 96 that are substantially compressed flat but retain their resiliency when the bolts 84 are tightened to hold the drum 74 to the hub 80. The gasket also has an axial flange 102 to give it stiffness.

The hub 80 has at the center a bearing supporting cylinder or sleeve 104 with an annular recess 106 at the inner end. An annular sealing lip 108 is secured to the axle 14 by the bolts 16. Adjacent the inner end a dual ring seal 112 is employed. The dual seal 112 has a two-part metal shell 114 placed in sleeve 104 in sealing relation and holding outer lip 116 which prevents the entrance of foreign matter and an inner lip seal 118 which prevents the egress or loss of lubricant. The lip seals are positioned in back to back relation and the lips are held in position by garter springs.

Just outside the dual seal 112 a roller bearing 120, which preferably has a guide for the rollers and is hand packed with lubricant, is positioned between the sleeve and supporting axle and held in position by inner snap rings 122 and outer snap ring 124 in the sleeve. Adjacent the outer snap ring 124 a shim ring 126 is fixed within the sleeve and secured by snap ring 128. Radially inward on the supporting axle is another annular shim ring 130 secured and sealed to the axle by gaskets 132. The shims 126 and 130 are merely used to make the annular space between the sleeve and the axle the proper size to receive the ring seal 134 which has a three-part metal frame clamping the sealing lip 136 in position. A garter spring holds the lip in contact with the shim 130.

On the outer side of the snap ring 128 a roller bearing 138 preferably of the sealed type, which is prepacked with lubricant, is employed. The bearing 138 has on each side an annular rubber seal 140 positioned in the annular space between the bearing races. The rubber seal 140 is held in position by an annular metal backing member 142 which is crimped over the edge of the rubber seal and is snapped in recesses in the bearing 138. The bearing 138 is held in position by an outer annular snap ring 141 sealed snapped in a groove in the sleeve 104, and an inner snap ring 143 snapped in the groove in the supporting axle. An annular locking element 144 is positioned between the inner and outer snap rings and is held in position by a portion of the brake supporting spider 28.

This completely enclosed brake structure provides seals at all the points where water or other foreign matter may enter the brake drum and prevents loss of lubricant from the bearings. The seal between the brake drum and the hub is formed of resilient metal to resist deterioration due to the heat of braking. At the supporting axle the complex arrangement of seals and bearings provides a bearing and seal unit which prevents the entrance of water or other foreign matter to the bearings, prevents the loss of lubricant from the bearings, and prevents the entrance of lubricant or water or other foreign matter to the brake mechanism. The dual seal, which has sealing lips arranged in back-to-back relation, retains the lubricant in the roller bearing and prevents the entrance of water. The single lip seal prevents lubricant from entering the brake mechanism. Also if the ball bearing is of the sealed type this will also help stop the entrance of foreign matter to the brakes.

Where a perfect seal is required between the wheel hub and supporting shaft, such as in this waterproof brake construction for military vehicles, the conventional tapered roller bearings have not proved entirely satisfactory. There is a tendency, due to wear and the axial spreading of the bearing races, to unduly increase the play or clearance in the bearing. When there is a large radial clearance in the bearings, the wheel hub will not rotate concentrically with the supporting shaft. Normally where seals are not necessary this is not objectionable, but where seals are required the eccentric rotation will crush and destroy the seals. In this improved construction the cylindrical roller bearing and ball bearing maintain the concentric relation much longer, and thus the seals have an increased life.

Various modifications will be apparent from the above described specific embodiment of the invention within the terms of the appended claims.

We claim:

1. A wheel assembly mounted on a hollow supporting axle, a driving shaft extending through said hollow axle, bearing means mounted between said driving shaft and hollow axle and supporting said driving shaft in said hollow axle for relative rotary movement and limited axial movement, a driving coupling connected to the outer end of said shaft, a brake drum having an inwardly extending flange at the outer side of said drum, means securing and sealing said flange to said coupling, spaced lugs extending outwardly from the inner edge of said drum, a rim with lugs positioned intermediate said drum lugs, a hub, means securing said drum and rim lugs to said hub, a seal positioned between said drum and hub, a sleeve portion of said hub surrounding said supporting axle, a pair of lip seals arranged back-to-back at the inner end of said sleeve between said hub and supporting axle, a roller bearing mounted between said hub and said supporting axle and outwardly adjacent said lip seals, having two parts mounted for relative rotary and axial movement supporting said hub on said supporting axle, a second lip seal facing inwardly and mounted between said hub and supporting axle adjacent said roller bearing, a ball bearing having two parts mounted between said hub and supporting axle and outwardly adjacent said second lip seal and providing relative rotary movement and axially fixed relative to each other to support the radial and axial load between said hub and said supporting axle, an inner snap ring on said axle and an outer snap ring on said sleeve, said rings mounted outwardly of said ball bearing to secure the bearings in position, and an annular locking element between said snap rings.

2. A wheel assembly mounted on a hollow supporting axle, a driving shaft extending through said hollow axle, a driving coupling connected to the outer end of said shaft, a brake drum having an inwardly extending flange at the outer side of said drum, means securing and sealing said flange to said coupling, spaced lugs extending outwardly from the inner edge of said drum, a rim with lugs positioned intermediate said drum lugs, a hub, means securing said drum and rim lugs to said hub, an annular resilient metal seal having annular undulations positioned between said drum and hub, said metal seal having an annular edge extending toward the shaft beyond the joint between the drum and hub, and an annular stiffening flange secured to said edge and extending transversely to the mean plane of said annular undulations a distance substantially greater than the height of said annular undulations, a sleeve portion of said hub surrounding said supporting axle, a pair of lip seals arranged back to back at the inner end of said sleeve between said hub and supporting axle, a roller bearing mounted between said hub and supporting axle and outwardly adjacent said lip seals, a second lip seal facing inwardly and mounted between said hub and supporting axle outwardly adjacent said roller bearing, a sealed ball bearing mounted between said hub and supporting axle outwardly adjacent said second lip seal, an inner snap ring on said axle and an outer snap ring on said sleeve, said rings mounted outwardly adjacent said ball bearing to secure the bearings in position, an annular locking element between said snap rings and a brake spider secured to the end of said axle and holding the locking element in position.

3. A wheel assembly mounted on a hollow supporting axle, a driving shaft extending through said hollow axle, a driving coupling connected to the outer end of said shaft, a brake drum having an inwardly extending flange at the outer side of said drum, means securing and sealing said flange to said coupling, spaced lugs extending outwardly from the inner edge of said drum, a rim with lugs positioned intermediate said drum lugs, a hub, means securing said drum and rim lugs to said hub, an annular resilient metal seal having annular undulations and a stiffening flange positioned between said drum and hub, a sleeve portion of said hub surrounding said supporting axle, a pair of lip seals arranged back-to-back at the inner end of said sleeve between said hub and supporting axle, a roller bearing mounted between said hub and supporting axle and outwardly adjacent said lip seals, a second lip seal facing inwardly and mounted between said hub and supporting axle outwardly adjacent said roller bearing, a sealed ball bearing mounted between said hub and axle support and outwardly adjacent said second seal, an inner snap ring on said axle and an outer snap ring on said sleeve, said rings being mounted outwardly adjacent said ball bearing to secure the bearings in position, an annular locking element between said snap rings, and a brake spider secured to the end of said axle and holding the locking element in position.

ROLAND V. HUTCHINSON.
MAURICE A. THORNE.

References Cited in the file of this patent
UNITED STATES PATENTS

| Number | Name | Date |
| --- | --- | --- |
| 843,394 | Haynes | Feb. 5, 1907 |
| 1,030,055 | Darlington, Jr. | June 18, 1912 |
| 1,859,351 | Zancan | May 24, 1932 |
| 1,922,962 | Lambert | Aug. 15, 1933 |
| 2,037,982 | Hughes | Apr. 21, 1936 |
| 2,075,563 | Alden | Mar. 30, 1937 |
| 2,095,039 | Schmidt | Oct. 5, 1937 |
| 2,245,612 | Schultz | June 17, 1941 |